(12) United States Patent
Knapp

(10) Patent No.: US 6,186,698 B1
(45) Date of Patent: Feb. 13, 2001

(54) CONNECTING ELEMENT

(75) Inventor: Friedrich Knapp, Amstetten (AT)

(73) Assignee: Friedrich Knapp Gesellschaft m.b.H., Amstetten (AT)

( * ) Notice: Under 35 U.S.C. 154(b), the term of this patent shall be extended for 0 days.

(21) Appl. No.: 08/704,778

(22) PCT Filed: Mar. 17, 1995

(86) PCT No.: PCT/AT95/00052

§ 371 Date: Sep. 9, 1996

§ 102(e) Date: Sep. 9, 1996

(87) PCT Pub. No.: WO95/25898

PCT Pub. Date: Sep. 28, 1995

(30) Foreign Application Priority Data

Mar. 18, 1994 (DE) ............................................. 94 04 642 U

(51) Int. Cl.[7] .................................................... B25G 3/36
(52) U.S. Cl. ........................ 403/397; 403/401; 403/357; 403/326
(58) Field of Search ................................... 403/397, 401, 403/402, 381, 384, 389, 396, 357, 356, 294, 292, 326

(56) References Cited

U.S. PATENT DOCUMENTS

| 4,025,216 | * | 5/1977 | Hives | 403/381 |
| 4,701,066 | | 10/1987 | Beam et al. | |
| 5,267,425 | * | 12/1993 | Onysko et al. | 403/381 X |
| 5,297,889 | * | 3/1994 | Crouse et al. | 403/397 X |
| 5,323,584 | * | 6/1994 | Scarlett | 403/381 X |

FOREIGN PATENT DOCUMENTS

| 2163787 | 7/1973 | (FR) . |
| 2209024 | 6/1974 | (FR) . |
| 2304808 | 10/1976 | (FR) . |
| 83/01476 | 4/1983 | (WO) . |

* cited by examiner

*Primary Examiner*—Terry Lee Melius
*Assistant Examiner*—William L. Miller
(74) *Attorney, Agent, or Firm*—Venable; Gabor J. Kelemen

(57) ABSTRACT

In a combination of a construction member with a connecting element the construction member is provided with a groove having opposite, inwardly mutually divergent, planar side wall portions. The connecting element, as viewed longitudinally, is formed as a rail section and includes at least two elastic legs cooperating as a pair having a free outer end. The legs are bendable to one another into a compressed condition. In a relaxed, uninstalled state the outer sides of said legs are mutually divergent towards the free outer end, and in an installed state the legs of the pair are received in the groove in the compressed condition such that the outer sides of the legs are mutually divergent towards the free outer end, whereby the outer sides of the legs resiliently engage the planar side wall portions of the groove of the construction member for holding the connecting element in the groove by friction.

1 Claim, 6 Drawing Sheets

CONNECTING ELEMENT

BACKGROUND OF THE INVENTION

The invention relates to a connecting element for connecting preferably wood or materials having similar mechanical properties. The construction members to be connected may releasably or non-releasably be connected with each other.

Connecting elements in the field of the production of furniture are sufficiently known from the prior art. Thus, e.g., the members to be connected are provided with pocket hole bores, into which wooden dowels are inserted as the connecting elements. With non-releasable connections, gluing is additionally effected. Furthermore, connections are known, in which dovetail-shaped grooved construction members and mating insert portions are connected with each other.

These and similarly functioning connecting elements according to the prior art have a number of disadvantages. In releasable connections, a deterioration of the precision of fit will have to be expected after several releases and re-connections have been effected; also the pull-out force, i.e. the force required for release of the connection, will decrease. In non-releasable connections, the members will have to be maintained under an external mechanical pressure until the glue used binds. This pressure generally is created by clamping devices. These clamping devices (e.g. screw clamps) are complex to handle and thus are not well suited for an in-line mass production process.

SUMMARY OF THE INVENTION

Thus, it is an object of the invention to provide a connecting element which may be used both, for a releasable as well as for a non-releasable connection, wherein the releasable connection shall guarantee a frequent release without substantially diminishing the precision of fit or the pull-out force, and the production of a non-releasable connection is to be feasible without external clamping means.

This object and others to become apparent as the specification progresses, are accomplished by the invention, according to which, briefly stated, in a combination of a construction member with a connecting element the construction member is provided with a groove having opposite, inwardly mutually divergent, planar side wall portions. The connecting element, as viewed longitudinally, is formed as a rail section and includes at least two elastic legs cooperating as a pair having a free outer end. The legs are bendable to one another into a compressed condition. In a relaxed, uninstalled state the outer sides of said legs are mutually divergent towards the free outer end, and in an installed state the legs of the pair are received in the groove in the compressed condition such that the outer sides of the legs are mutually divergent towards the free outer end, whereby the outer sides of the legs resiliently engage the planar side wall portions of the groove of the construction member for holding the connecting element in the groove by friction.

The connecting element is pressed or laterally inserted into a preferably undercut groove. Preferably, the upper edges of the groove may also comprise a chamfer. Thus it is ensured that the connecting element will snap into the groove on account of its resilience. The connecting element is dimensioned relative to the groove such that after latching, the connecting element can no longer assume its original shape and thus, on account of the lasting mechanical resilience, in addition to the positive locking also a non-positive connection is formed between the connecting element and the members to be connected. If two members are to be interconnected, the grooves are dimensioned such relative to size and shape of the connecting element, that the resilience of the connecting element causes a pulling together of the members to be connected.

If a releasable connection is provided, the resilience of the connecting elements equals out both the production tolerances of the groove as well as widening of the groove formed during frequent releasing and making of the connection.

With a non-releasable connection, the surfaces to be connected are additionally provided with a glue. On account of the resilience of the connecting element, the surfaces to be connected will be pressed at each other without any external clamping device.

According to a further feature of the invention, an especially designed extruded section may be used, wherein the elastic legs have arrowhead-shaped ends each having an edge acting as a barb and each having a sliding or guiding flank.

Furthermore, for increasing the elastic properties of the legs, a recess acting like a joint may be provided. An improvement of the positioning precision of the connecting element in the groove is achieved by adjusting abutments preferably abutting on the chamfer of the groove. To increase the pull-out force, a blocking means may additionally be introduced between the elastic legs of the connecting element. This blocking means may be formed both, of a section material adapted to the shape of the clearance, as well as of a foamed material or a resilient ledge. The connecting element may be provided with fixing elements. These fixing elements may be designed as a gluing or screwing plate, a threaded pin or a nail pin. The connection may also be formed by a double-slot groove. With larger dimensions of the connecting element designed as an extruded section, recesses in the cross-sectional profile of the connecting element may be provided to reduce the material used.

The invention will now be explained in more detail by way of preferred exemplary embodiments, to which, however, it shall not be limited, and with reference to the drawings.

DESCRIPTION OF THE PREFERRED EMBODIMENTS

Figure 1:
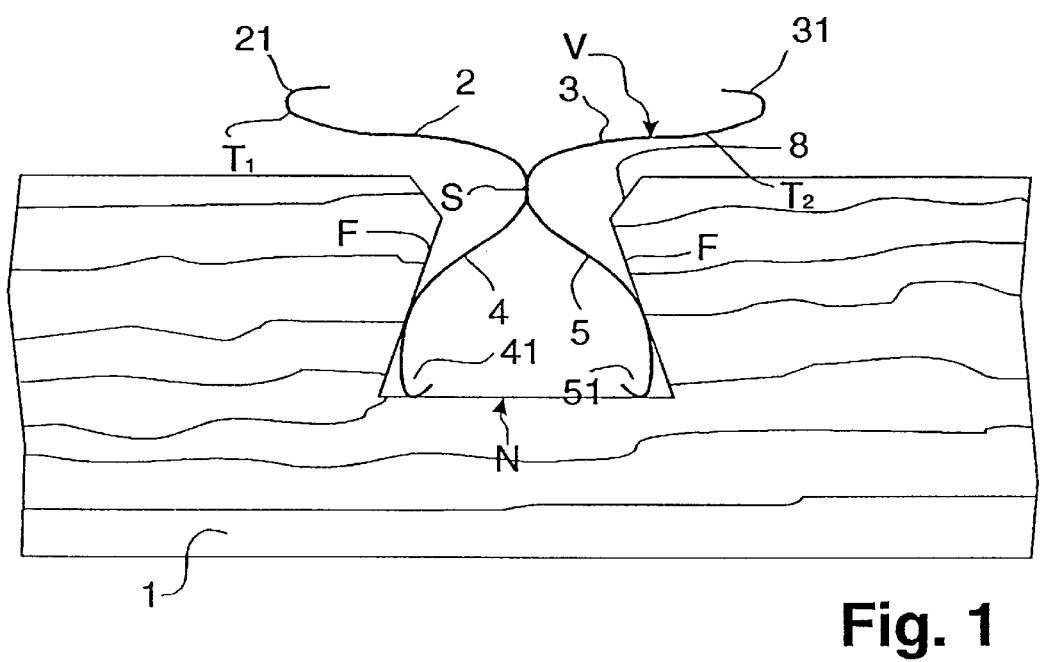
FIG. 1 is a view of a connecting element formed of spring steel elements, inserted in a groove.

FIG. 1 shows a construction member 1 of wood, into which a dovetail-shaped undercut groove N has been incorporated, whose planar, opposite flanks F comprise a chamfer 8 at their open sides. The planar flanks F are mutually divergent as they extend from the outer face 1' of the construction member 1 into its material. A connecting element V made of spring-steel elements and formed by two parts T1, T2 is provided for introduction into this groove N, the parts T1, T2 being roller-welded together and connected to form an X-shaped element so that two pairs of cooperating parallel legs 2, 3; 4, 5 are formed opposite the web S formed by the roller welding, which are diverging in pairs in the shape of a V and are each insertable into an associated groove N by elastic compression. In their final position, in the mounted state, the legs 2, 3; 4, 5 abut on the flanks F of the groove N under an elastic biasing force and thus the compressed legs are held by friction in the groove N.

When pressing a pair of legs, the legs 4, 5 in this instance, into the groove N, the chamfer 8 serves to guide and to facilitate the pressing into the groove N. This is also aided by the angular portions 21, 31; 41, 51 provided on the ends of the legs 2, 3; 4, 5, which, furthermore make sure that the flanks F of the grooves are not damaged by the sharp-edged ends of the legs 2, 3; 4, 5. The legs 2, 3 arranged opposite the groove N shown will be inserted into a respective groove of a further construction member (not illustrated in FIG. 1) to be connected with the construction member 1, the construction members 1 being closely pulled together under the biasing force of the elastically deformed legs 2, 3 and the inclined flanks of the associated groove.

Such a connecting element V may be pushed into the open groove of a construction member from the side of the opening section with the chamfer 8 (i.e. from above according to the illustration of FIG. 1). It is, however, also possible to insert the connecting element V into the groove N from the front side of the groove N in the longitudinal direction of the groove, which may, e.g., be useful if the construction members have been pre-assembled in any form, and the side of the opening section of the groove is no longer freely accessible.

Figure 2:
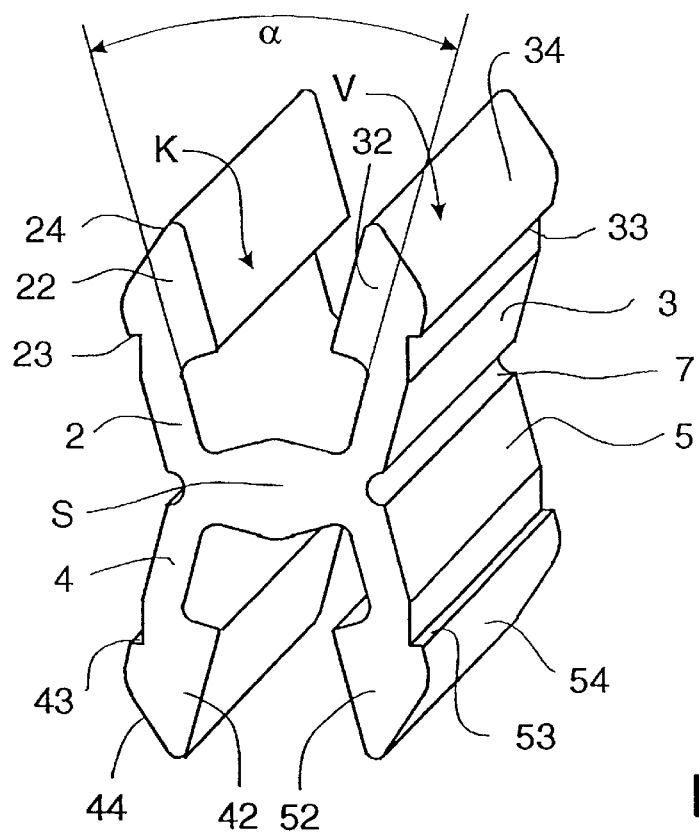
FIG. 2 is an illustration of a connecting element made of an extruded section.

FIG. 2 shows a different embodiment of the connecting element V which, at present, is particularly preferred, and which differs from the embodiment according to FIG. 1 in that it is a portion of an extruded section made of synthetic material.

In the instance illustrated, corresponding parts have been denoted by the same reference numbers as in FIG. 1. In the case of this extruded section according to FIG. 2, two pairs of legs 2, 3; 4, 5, depart in opposite directions from a central web S, with greater wall thicknesses being necessary because synthetic material is not as strong as spring steel. The module of elasticity of the synthetic material should be at least the 0.2-fold of steel. The web S and the respective legs together form a generally U-shaped channel K, the legs 2 and 3 or 4 and 5, respectively, forming an angle α between them, so that the channel widens outwards towards the ends of the legs, in the shape of a V. The free ends of the legs 2, 3, 4, 5 form arrow-shaped tips 22, 32, 42, 52 whose cross-section varies in thickness both inwardly, into the channel K, and outwardly, as compared to the leg cross-section in the region close to the web S, and which form a type of barb edge 23, 33, 43, 53 on the outer side, followed by sliding or guiding flanks 24, 34, 44, 54. In the region of the web S, one recess 7 is each provided on the outer side of the connecting element V, over the longitudinal extension of this connecting element V, on either side thereof, which recess reduces the cross-section of the neighbouring leg 2, 3, 4 or 5, respectively, at its origin at the transition to the web S to an extent that an elastic deformation is possible when compressing the legs to press them into a groove N.

Figure 3:
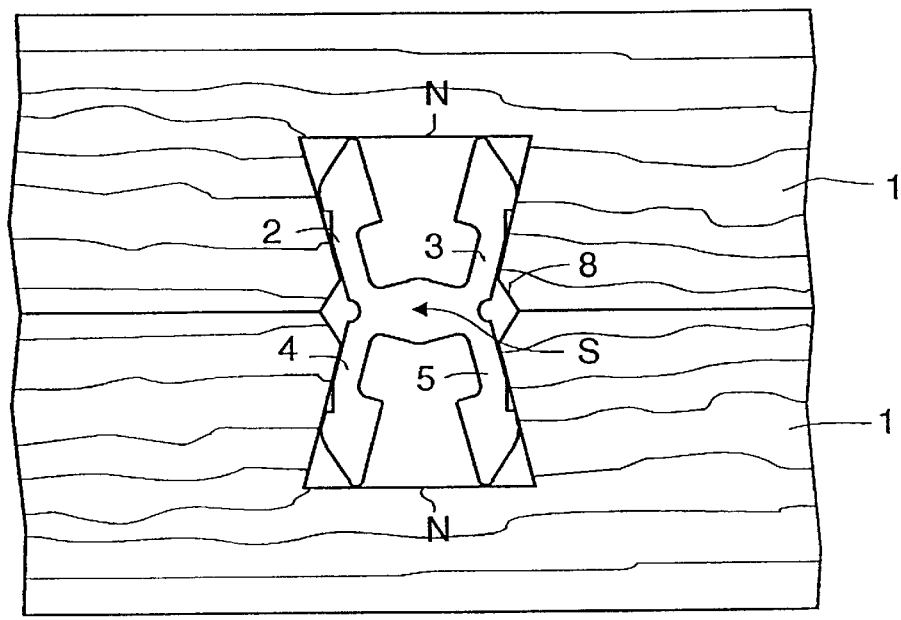
FIG. 3 shows the connecting element made of an extruded section in action.

FIG. 3 shows this connecting element V according to FIG. 2 in operation to connect two construction members 1, 1. Insertion of this connecting element V is accomplished in the same manner as described by way of FIG. 1. From FIG. 3 it can be seen that the two pairs of legs, 2, 3, 4, 5 of this connecting element V cooperate to keep the two construction members 1, 1 together.

Figure 4:
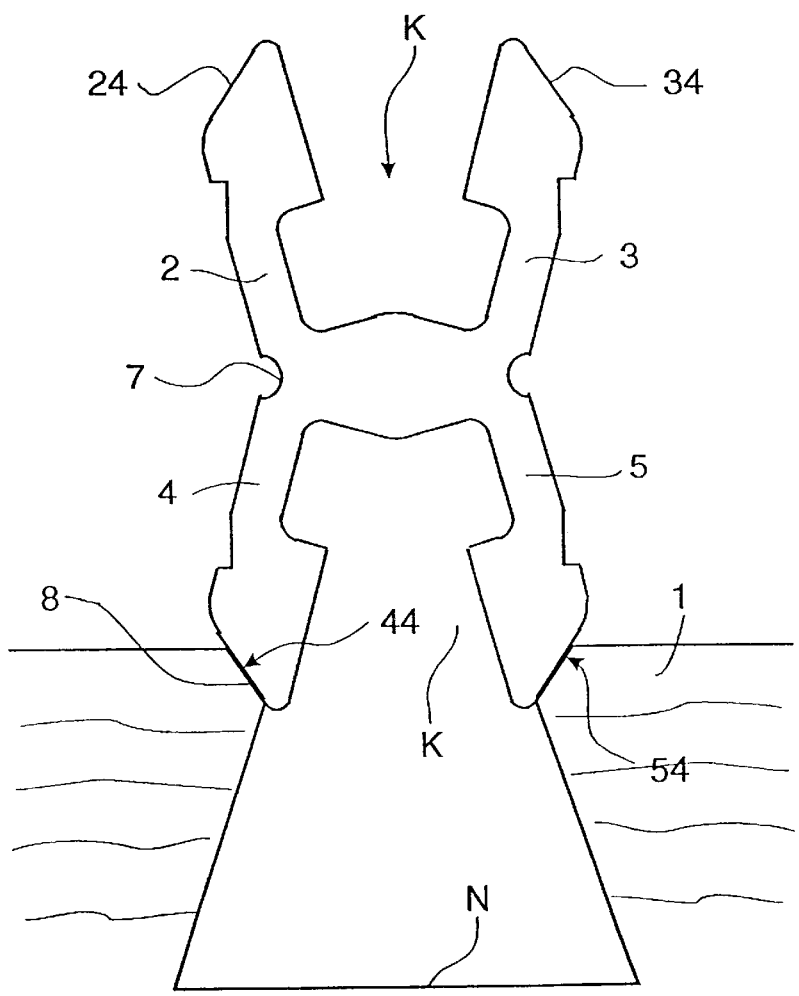
FIG. 4 is a view of a connecting element corresponding to FIGS. 2 and 3 as well as of a dovetail groove provided with a chamfer.

FIG. 4 shows clearly how the sliding flanks or surfaces 44, 54 of the legs 4, 5 elastically cooperate in connection with the chamfer 8 when pressing a pair of legs 4, 5 into a groove N, so that after having passed the narrowest point of the groove N, they straddle again elastically and snap into the groove N.

Figure 5:
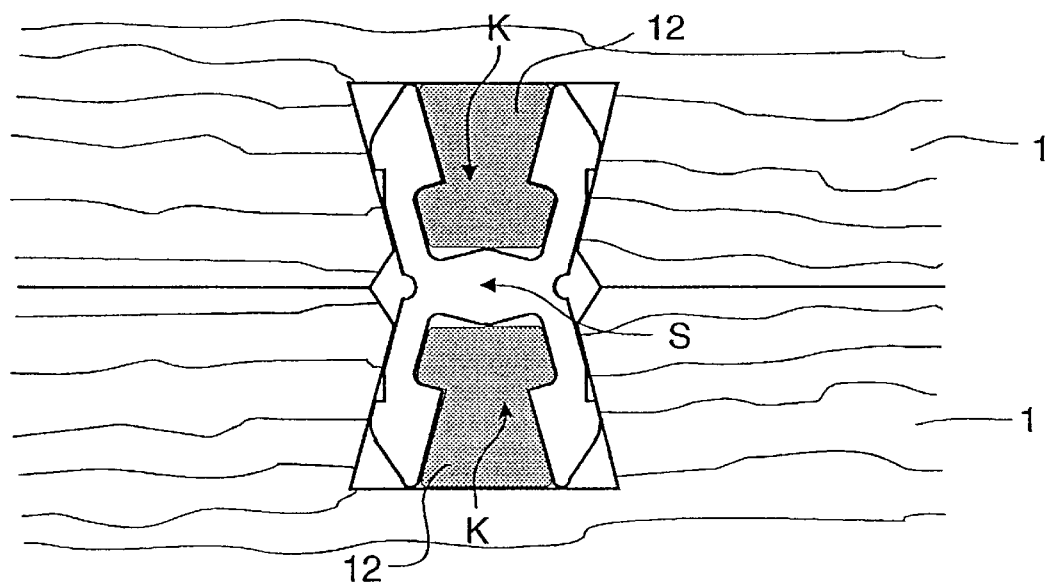
FIG. 5 is a view of a connecting element in position, together with a blocking means.

To increase the holding effect of the connecting element V according to FIG. 2, the channel K, according to FIG. 5, may be filled with a blocking means 12 which prevents compression of the legs 2, 3 or 4, 5, respectively, and thus prevents pulling apart of the construction members 1, 1 after they have been assembled. Material sections completely filling the channel K and consisting of a material selected in accordance with the desired pull-out resistance are suited as the blocking means 12.

The blocking means 12 may also be an extruded section which is inserted into the channel K of the connecting element V from one of its front sides. Furthermore, a resilient ledge portion (not illustrated) may be clamped between the cooperating legs 2, 3 or 4, 5, respectively, of the connecting element V, as a blocking means 12. As may be observed in FIG. 5, the blocking means 12 is cross-sectionally mushroom-shaped, that is, it has a terminal enlargement which is received in a complemental hollow enlargement of the channel K such that the blocking means 12, upon its insertion longitudinally into the channel K from an end thereof, is held captive in the channel K.

Figure 6:
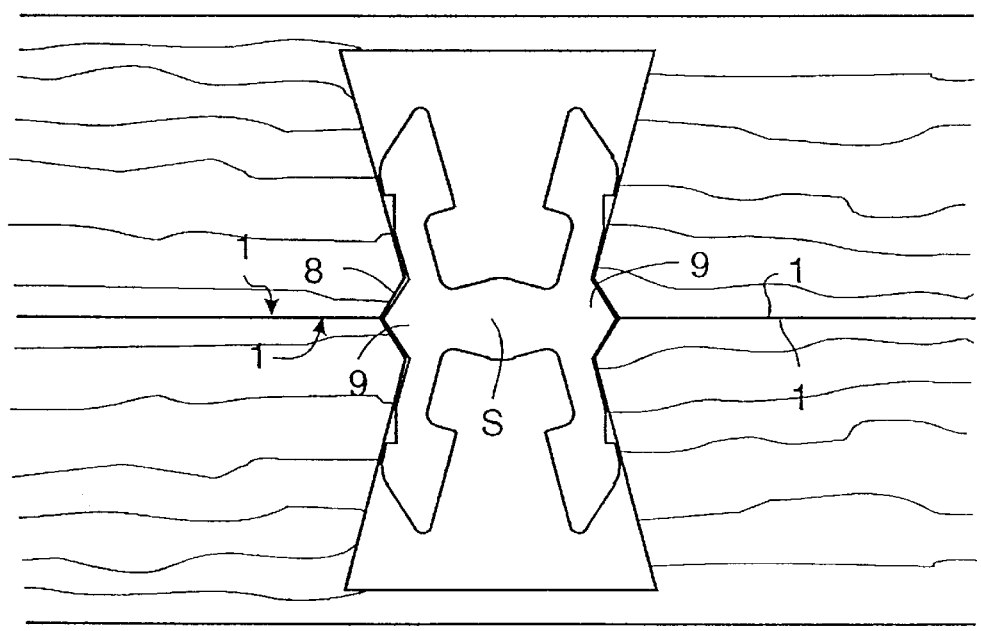
FIG. 6 is a view of a connecting element comprising adjusting abutments.

FIG. 6 shows a connecting element V varied relative to that of FIG. 2 in that wedge-shaped adjusting abutments 9 are formed on both external sides of the web S, which, when the connecting element V is mounted, abut on the chamfer 8 of the construction members 1, 1 arranged opposite each other.

Figure 7:
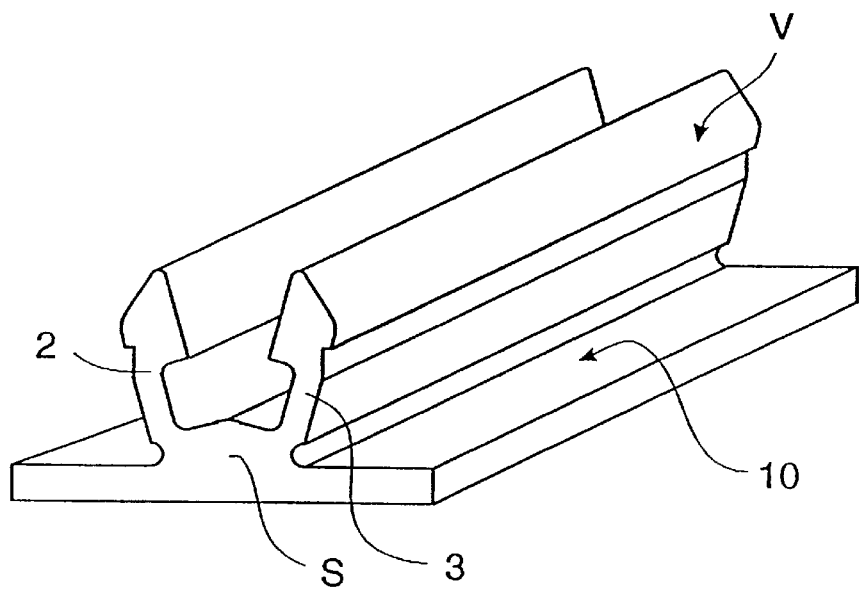
FIG. 7 is an illustration of a connecting element comprising a fixing plate.

In FIG. 7, a connecting element V is shown which has only one pair of legs 2, 3 as compared to the previously discussed connecting elements V, and which also is a portion of an extruded section of synthetic material, whose basic design corresponds to the extruded section of FIG. 2, which means that both the web S and the legs 2, 3 and the leg ends are designed accordingly. In the present instance, the web S is followed by a fixing element 10 integrally extruded with the connecting element V and serving for fixation on a respective base.

Figure 7A:
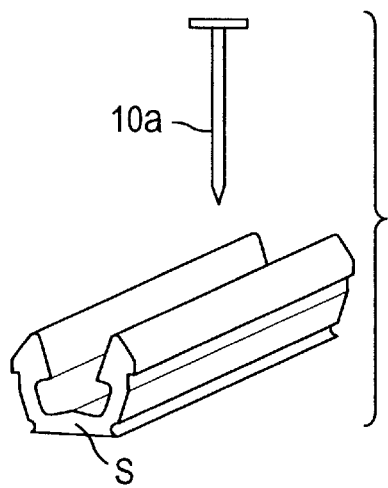
FIG. 7a is an illustration of a connecting element comprising a fixing nail pin.
Figure 7B:
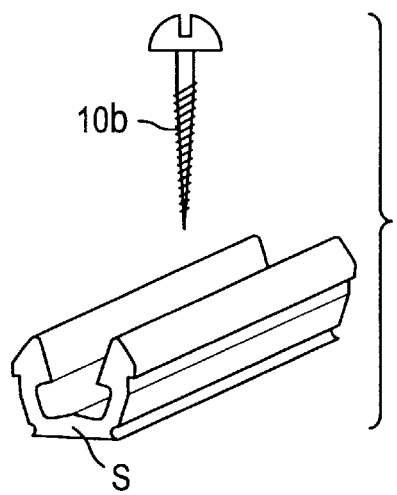
FIG. 7b is an illustration of a connecting element comprising a fixing wood screw.

Instead of this plate-shaped fixing element which may be used as a gluing or screwing plate, the web S can be provided with differently designed fixing elements, such as a nail pin 10*a* shown in FIG. 7*a* or a wood screw 10*b* shown in FIG. 7*b*.

Figure 8:
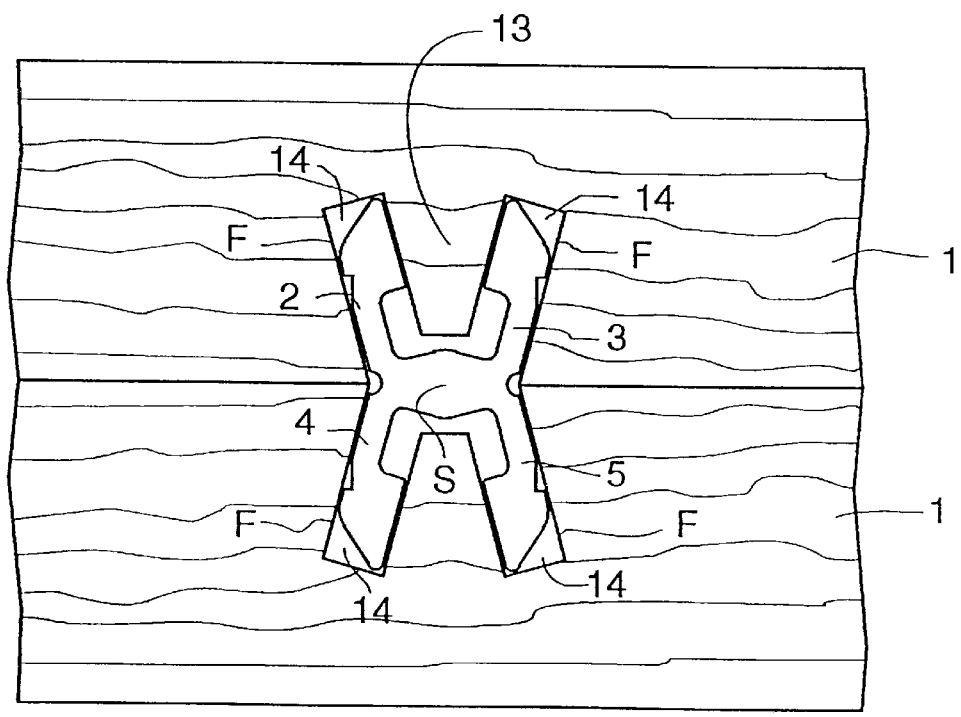
FIG. 8 shows the connection of construction members comprising a double-slot groove.

To accommodate the connecting elements V illustrated, also a groove design according to FIG. 8, according to which a separate inclined slot 14 may be provided for each individual leg 2, 3, 4, 5 instead of a dovetail-shaped undercut full groove N, a wedge-shaped web 13 remaining between the inclined slots 14 which is positioned between the legs 2, 3; 4, 5 cooperating in pairs and which presses apart the latter in wedge-like manner and thus presses them against the respective outer flanks of the inclined slots 14.

Figure 9:
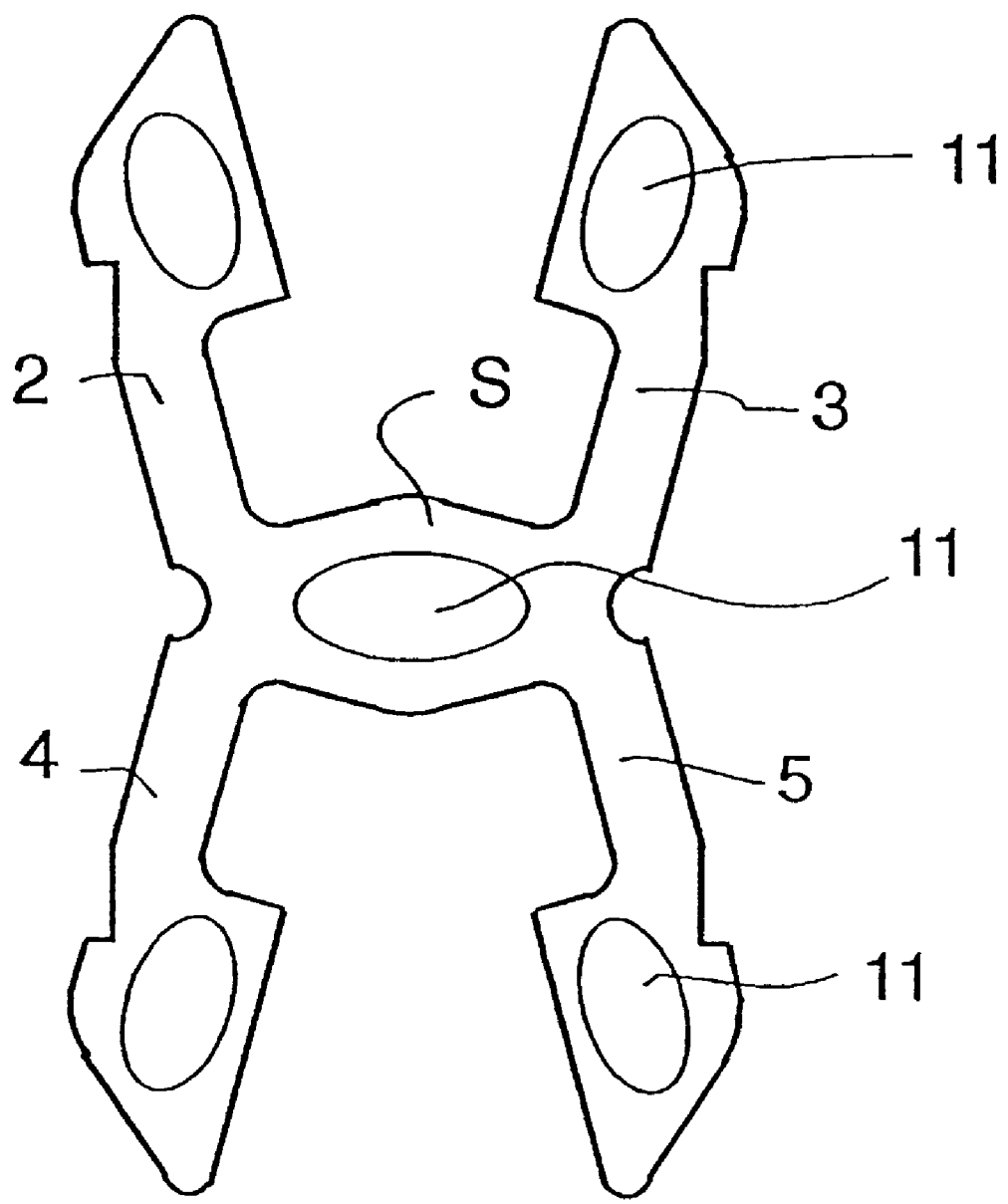
FIG. 9 is a view of a connecting element comprising recesses to reduce the material used.

In case large dimensions of the connecting elements V are required, according to FIG. 9 a reduction of the material used can be achieved by providing recesses or cavities 11 at the arrow-shaped ends of the legs 2, 3; 4, 5 and in the web S, which cavities may be produced automatically during the extrusion process.

The length of the connecting element V depends on the construction members 1 to be connected and, departing from an extruded section, may be determined where needed by measuring and cutting off. It is, however, also possible to provide connecting elements V of uniform length or a multiple thereof in a commercial size.

Figure 10A:
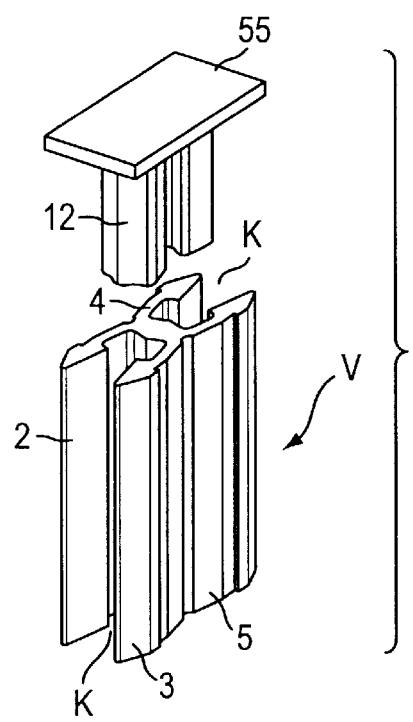
FIG. 10a is a perspective view of a connecting element and a unit formed of blocking means and a cover plate, prior to inserting the unit into the connecting element.
Figure 10B:
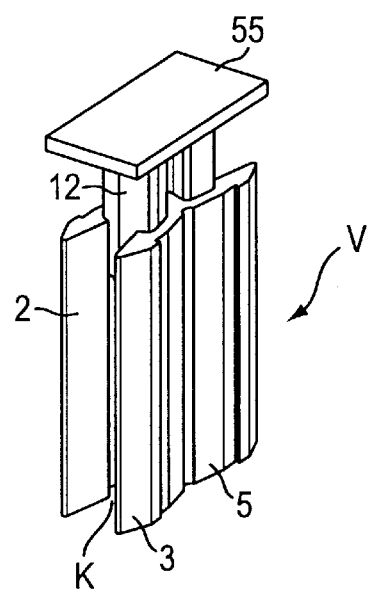
FIG. 10b is a perspective view similar to FIG. 10a, showing the unit in a partially inserted state.

Turning to FIGS. 10*a* and 10*b*, to cover (face) the groove n at its front side, a plate-shaped cover element (55) may be used, on which a portion of the blocking means 12 is arranged such that the blocking means 12 is insertable into the channel k between the legs 2, 3 and 4, 5, respectively, of the connecting element V, and in this position the plate-shaped cover element 55 ensures that the groove n is covered at its front side.

What is claimed is:

1. A combination of a construction member with a connecting element having an end face; said construction member being provided with a groove having opposite side wall portions; said connecting element, as viewed longitudinally, being formed as a rail section and including at least two elastic legs cooperating as a pair having a free outer end; said legs being bendable to one another into a compressed condition; said legs each having an outer side; in a relaxed, uninstalled state the outer sides of said legs being mutually divergent towards said free outer end, and in an installed state said legs of said pair being received in said groove in said compressed condition such that said outer sides of said legs are mutually divergent towards said free outer end, whereby said outer sides of said legs resiliently engage said side wall portions of said groove for holding said connecting element in said groove by friction; said legs together defining a channel of said connecting element; further comprising blocking means inserted between the elastic legs into said channel for preventing movement of the elastic legs towards one another; and a cover plate affixed to said blocking means and covering said end face.

* * * * *